Jan. 22, 1963
P. W. FUREY
3,074,372
VEHICLE SPEED INDICATOR
Filed Sept. 12, 1961
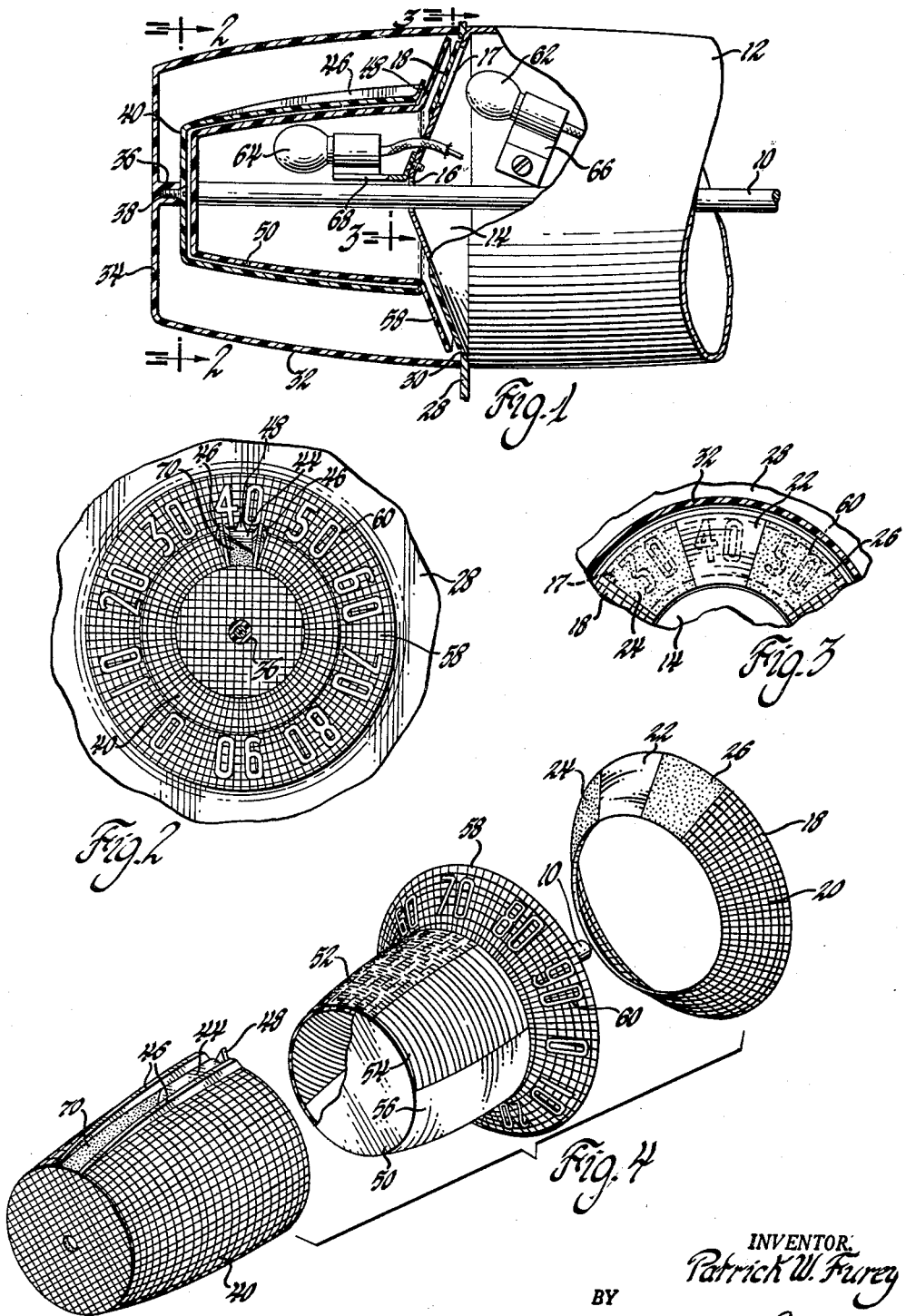
INVENTOR.
Patrick W. Furey
BY
George E. Johnson
ATTORNEY

United States Patent Office 3,074,372
Patented Jan. 22, 1963

3,074,372
VEHICLE SPEED INDICATOR
Patrick W. Furey, Royal Oak, Mich., assignor to General Motors Corporation, Detroit, Mich., a corporation of Delaware
Filed Sept. 12, 1961, Ser. No. 137,676
9 Claims. (Cl. 116—57)

This invention relates to indicators and more particularly to indicators such as speedometers in which a measurement of a value such as speed may be sharply and clearly indicated.

Speedometers as heretofore used generally include a movable pointer, slot and/or a variation in color adapted to serve in registry with a dial or drum in the background together with suitable indices to indicate speed in terms such as miles per hour. An example of such a construction is disclosed in the United States Patent 2,191,045, granted February 20, 1940, in the name of J. W. Slayton.

An object of the present invention is to provide an improved indicator of compact construction which is capable of sharply, clearly and vividly presenting a reading to an observer. Another object is to provide an indicator conducive to lightweight construction, which may be esthetically pleasing, and is simple as well as low in cost.

To these ends, a feature of the present invention is an indicator including a fixed opaque cover member having a wall with a window therein, a driving shaft supporting a rotatable drum having markings such as contrasting colors and which are visible through the window to cooperate with exposed indices on an extension fixed to the drum to present readings.

These and other features of the invention will now be described in detail and then pointed out more particularly in the appended claims.

In the drawings:

FIGURE 1 is an elevation view of an indicator forming one embodiment of the present invention, parts being broken away better to illustrate the construction;

FIGURE 2 is a sectional view looking in the direction of the arrows 2—2 in FIGURE 1 and omitting an outer portion for clarity;

FIGURE 3 is a sectional view looking in the direction of the arrows 3—3 in FIGURE 1; and FIGURE 4 is an exploded and perspective view of parts utilized in the indicator assembly of FIGURE 1.

Speedometer shafts are conventionally driven against the yielding resistance of a hair spring by means of a rotating magnet and speed cup. Such an arrangement is shown in the United States Patent 2,798,174, granted July 2, 1957, in the name of R. O. Helgeby. A similar drive means may be employed in the present instance to drive or rotate a shaft 10. The details regarding the drive means are not given herein, as they form no part of the present invention.

The drive shaft 10 is arranged with one end portion protruding from a supporting structure 12 which may be a fixed portion of an instrument panel. This structure is illustrated as being tubular, but it will be appreciated that it may take any from insofar as the present invention is concerned. The end of the structure 12 bears a fixed, opaque and slightly conical light shield 14 closing the end of the structure 12 except for a clearance opening 16 through which the shaft 10 extends and also an arcuate window 17 which is covered by a plastic light filter element 18. The latter is in the form of a truncated cone and is made opaque as at 20 for the major portion of its circumference. A minor portion of the filter element is made clear as at 22 and at adjacent areas 24 and 26 the filter element is made translucent. The window 17 is of such size as to register with all three areas 22, 24 and 26 of the filter element.

A thin wall 28 is shown in FIGURE 1 as a part of the supporting structure for the indicator. This wall is apertured as at 30 for the reception of the conical end closure 14 of the structure 12. Joined to the thin wall 28 is a fixed transparent member 32 which is cup-like in shape and has a closed end 34 bearing an inner boss 36. This boss is arranged with the help of a set-screw 38 to hold an opaque cover member 40. The latter is cup-shaped somewhat like the transparent member 32, but is considerably smaller and is provided with a circular edge and an elongated window 44 located between two ridges 46 and extending toward the edge. A pointed projection 48 is located at the end of the window and may be colored for a purpose which will become apparent as the description proceeds. It will be noted that the wall of the opaque cover member 40 bearing the window 44 is such that the length of the window 44 and the axis of the shaft 10 lie in the same plane.

Rotatably mounted within the opaque cover member 40 is a translucent plastic drum 50, the peripheral wall of which is divided into a number of differently colored segments, such as the segments 52, 54 and 56 best seen in FIGURE 4 of the drawings. These translucent color segments represent markings instrumental in making the indicator effective in its operation.

Integral with the drum 50 is an extension piece 58 in the form of a flange spaced from the filter element 18 and substantially parallel therewith. This extension piece 58 is made opaque except for indices 60 which are made transparent. It will be noted that the colored drum 50 conforms substantially with the shape of the opaque cover member 40 and that the colored portions thereof are substantially concealed by the cover member 40, whereas the extension piece 58 is open to view through the transparent lens 34. Bulbs 62 and 64 are mounted in the structure 12 and within the structures 12 and 50 on brackets 66 and 68, respectively. These bulbs are in the same plane as the shaft 10 and the window 44 as well as the center of the window 17.

In the operation of the indicator, the shaft 10 is rotated against a hair spring an extent dependent upon the speed to be measured. Assuming that speed to be 40, as shown in FIGURES 2 and 3, light will emanate from the bulb 64 and disclose a vivid color section of the drum 50 consistent with that speed. At the same time, the speed will be indicated by the corresponding index on the extension piece 58. This index or figure will be visible by virtue of illumination from the bulb 62. The light rays from the bulb 62 will clearly illuminate the number 40 in alignment with the appropriate illuminated segment of the drum 50 which appears through the window 44. When the index number 40 is clearly illustrated, the two adjacent indices 30 and 50 will be illuminated but to a lesser extent as depicted in FIGURE 3.

The transparent member 32 serves to keep the indicator clean and is conducive to produce an advantageous styling effect. It will be appreciated that various modifications may be made within the spirit of the present invention as for example, the window 44 may be partly transparent vividly to indicate the appropriate color from the drum 50 for the speed attained but an area 70 of the window may be translucent so that the light transmitted through the window varies in intensity.

I claim:
1. An indicator including a fixed opaque cover member having a wall having an edge and defining an elongated window extending toward the said edge, a driving shaft having one end portion extending along one side of said wall, the length of said window and the axis of said shaft lying in the same plane, a drum partially concealed by said wall and coaxially fixed to said shaft to rotate therewith, an extension piece fixed to said shaft and drum and located adjacent said edge and at an angle with said wall, indices on said extension piece, a marking on said drum visible through said window and cooperating with one of said indices in line with said window to give an indication of value being measured.

2. An indicator such as set forth in claim 1, the said drum marking including separate colored areas.

3. An indicator such as set forth in claim 1 including a support and having colored areas on said drum and a cup-shaped transparent member mounted with said opaque cover member on said support and enclosing said opaque cover member which is also cup-shaped.

4. An indicator including a fixed opaque cover member having a wall having an edge and defining an elongated window extending toward said edge, a driving shaft having one end portion extending in the substantially parallel with said wall, a drum partially concealed by said wall and fiexd to said shaft to rotate therewith, a light penetrable extension piece fixed to said drum and shaft and located close to the said edge of said wall, indices on said extension piece, a fixed light shield adjacent to said indices, an arcuate window in said shield in registry with some of said indices, a light source for directing light beams through said arcuate window, a marking on said drum visible through said elongated window and cooperating with one of said indices and viewable through said arcuate window to give an indicator reading.

5. An indicator such as set forth in claim 4 in which the said arcuate window of said fixed light shield has three adjacent sections for illuminating three adjacent indices, and the central section of said three sections being clear and the other two being translucent.

6. An indicator including a fixed opaque cover member in the shape of a cup with a circular edge, the side wall of said cup defining an elongated window extending toward said edge, a driving shaft having one end portion extending into said cup and coaxial therewith, the length of said window and the axis of said shaft lying in the same plane, a colored translucent drum partially concealed by said opaque cover member and fixed to said shaft to rotate therewith, an extension piece fixed to said drum and located clear of said edge and at an angle with said wall, indices on said extension piece, and means within said drum for conducting light rays through said drum and window and also to illuminate said indices.

7. An indicator such as set forth in claim 6, the colored drum being tapered, the extension piece being of light penetrable material to accent said indices and having a group of three light penetrable sections adapted to register with three indices, and one of said sections being more transparent than the other two.

8. An indicator including a support, an opaque cover member having a cup shape with a circular edge, an elongated window in the wall of said cover member and extending toward said edge, a driving shaft having one end portion extending along said wall within said cover member, the length of said window and the axis of said shaft lying in the same plane, a translucent drum having differently colored segments and nesting with but spaced from said opaque cover member and coaxially fixed to said shaft to rotate therewith, an extension piece marked with indices and fixed to said drum and shaft to rotate therewith along said edge, means for projecting light rays through said drum and window and to illuminate said indices, and a transparent cup-shaped member fixed in position and said shaft and enclosing said opaque cover member and extension piece.

9. An indicator such as set forth in claim 8, the said indices being light penetrable, and each of said colored segments being in the plane of said shaft and one of said indices to cooperate with the latter in numerically indicating a reading in color.

References Cited in the file of this patent
UNITED STATES PATENTS
2,579,806     Dvorkin _____ Dec. 25, 1951